Nov. 22, 1938.  W. A. WHITE  2,137,934
POWER UNIT
Filed Jan. 17, 1936   5 Sheets-Sheet 2
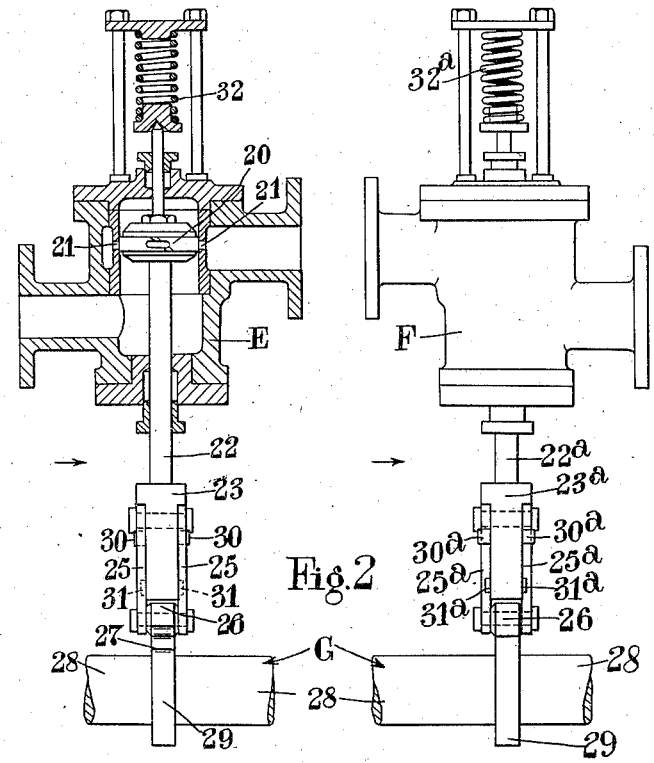
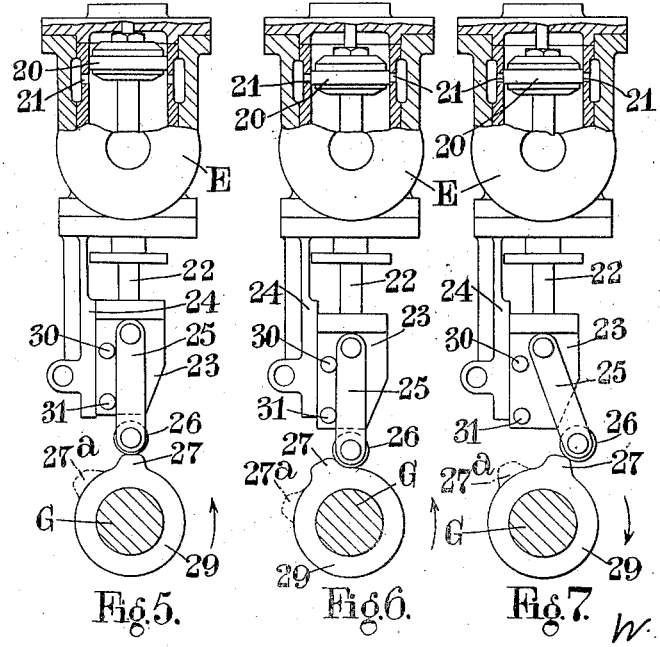
Fig. 2.
Fig. 5.   Fig. 6.   Fig. 7.
Inventor
W. A. White
By Glascock Downing & Seebold
Attys.

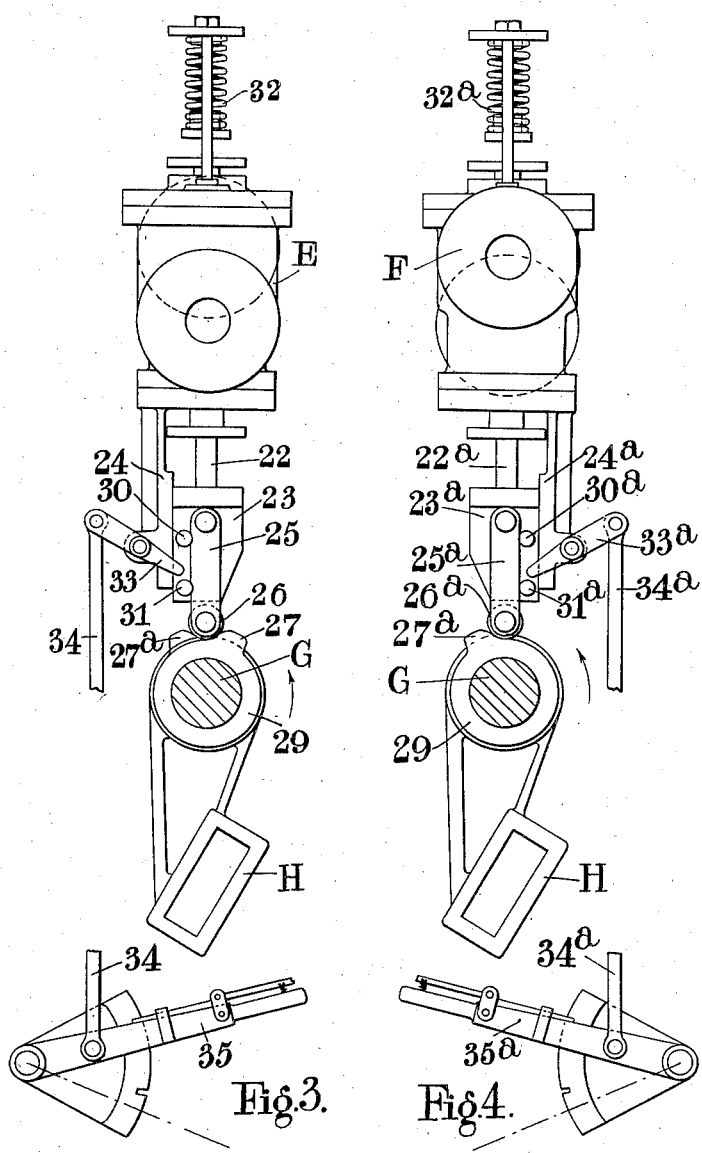

Patented Nov. 22, 1938

2,137,934

UNITED STATES PATENT OFFICE 2,137,934

POWER UNIT

William Albert White, Hebburn-on-Tyne, England, assignor to White's Marine Engineering Company, Limited, Hebburn-on-Tyne, England Application January 17, 1936, Serial No. 59,619
In Great Britain January 18, 1935

1 Claim. (Cl. 60—21)

The invention relates to power units comprising a reciprocating engine, hereinafter called a "reciprocator" exhausting into a turbine, said reciprocator and turbine constituting prime movers of different characteristics as regards starting and stopping due to differences in speed of revolution of the moving masses and so forth.

According to one form of such a unit comprising a reciprocator and a turbine, the turbine transmits power to the crankshaft of the reciprocator while according to another form, both the reciprocator and the turbine transmit power to a third shaft, such as a marine propeller shaft.

In such installations, it has been proposed to transmit power mechanically, e. g., through double-helical gearing, electrically or hydraulically.

In power units of the kind referred to, it is found that on account of the high speed and great inertia of the turbine rotor, the reciprocator tends to start and stop more quickly than the turbine. It is found that the great inertia of the turbine rotor continues to move the reciprocator in an ahead direction after it has been put into reverse, and owing to the reciprocator exhausting to the turbine, the reciprocator may make two or three revolutions before steam admitted to the high-pressure chest reaches the astern turbine.

With a view to overcoming such difficulties, the present invention consists in the combinations of elements hereinafter described and particularly pointed out in the claim.

Referring to the accompanying drawings which are of a diagrammatic nature:—

Figure 2 shows an elevation partly in section to a larger scale of the auxiliary valves and mechanism for operating them from the weigh-shaft of the reciprocator;

Figure 1:
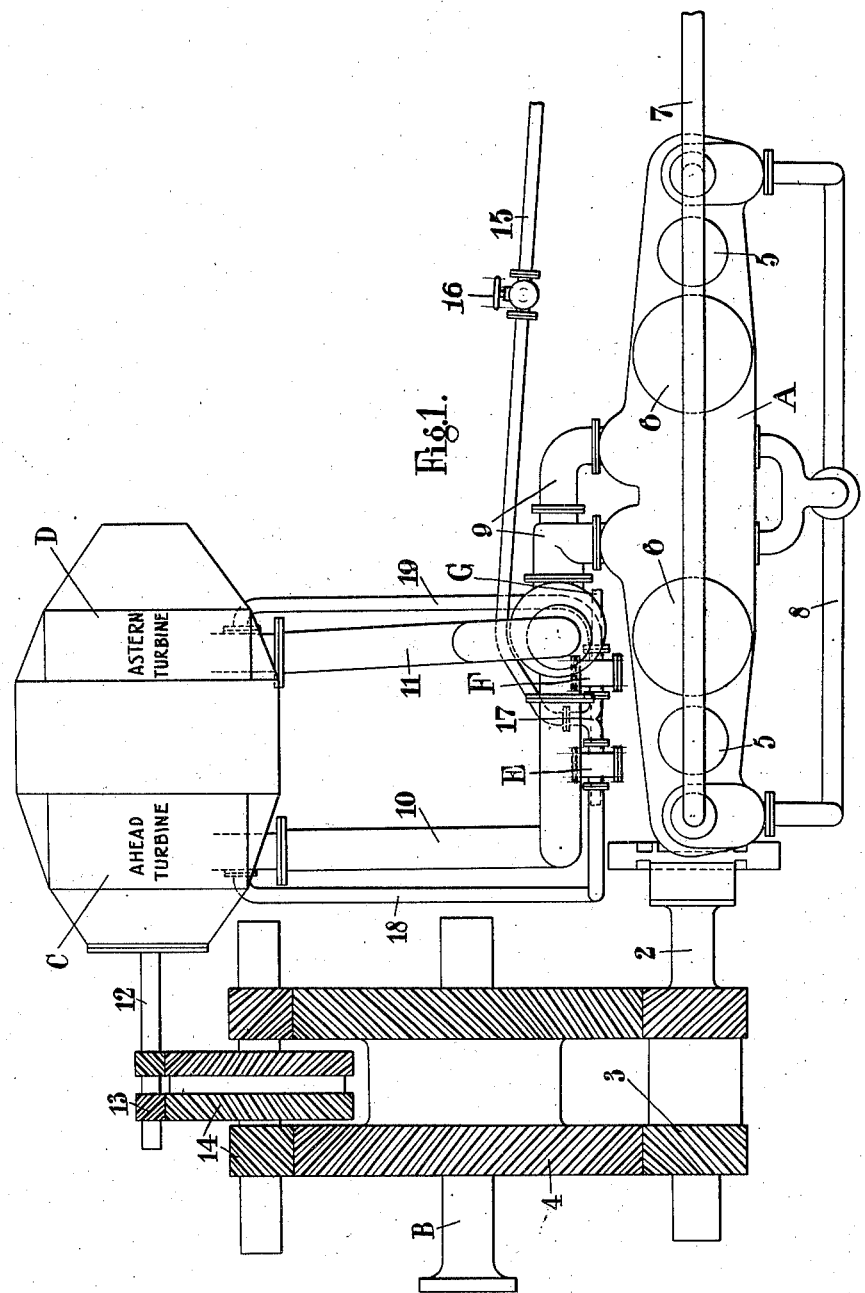
Figure 1 shows a general lay-out of one form of reciprocator-turbine power installation according to the present invention, showing valves controlling auxiliary steam to turbines.
Figure 8:
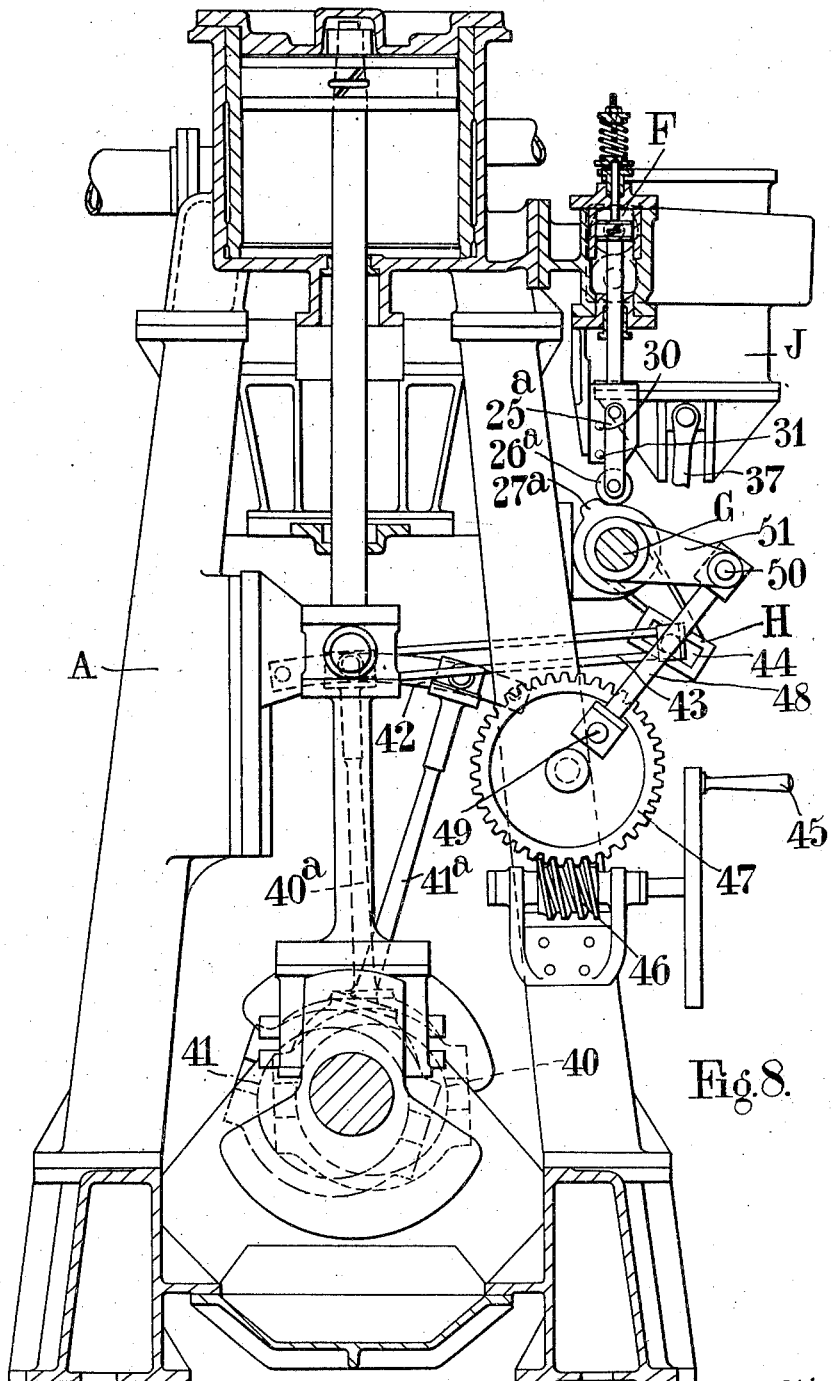
Figure 9:
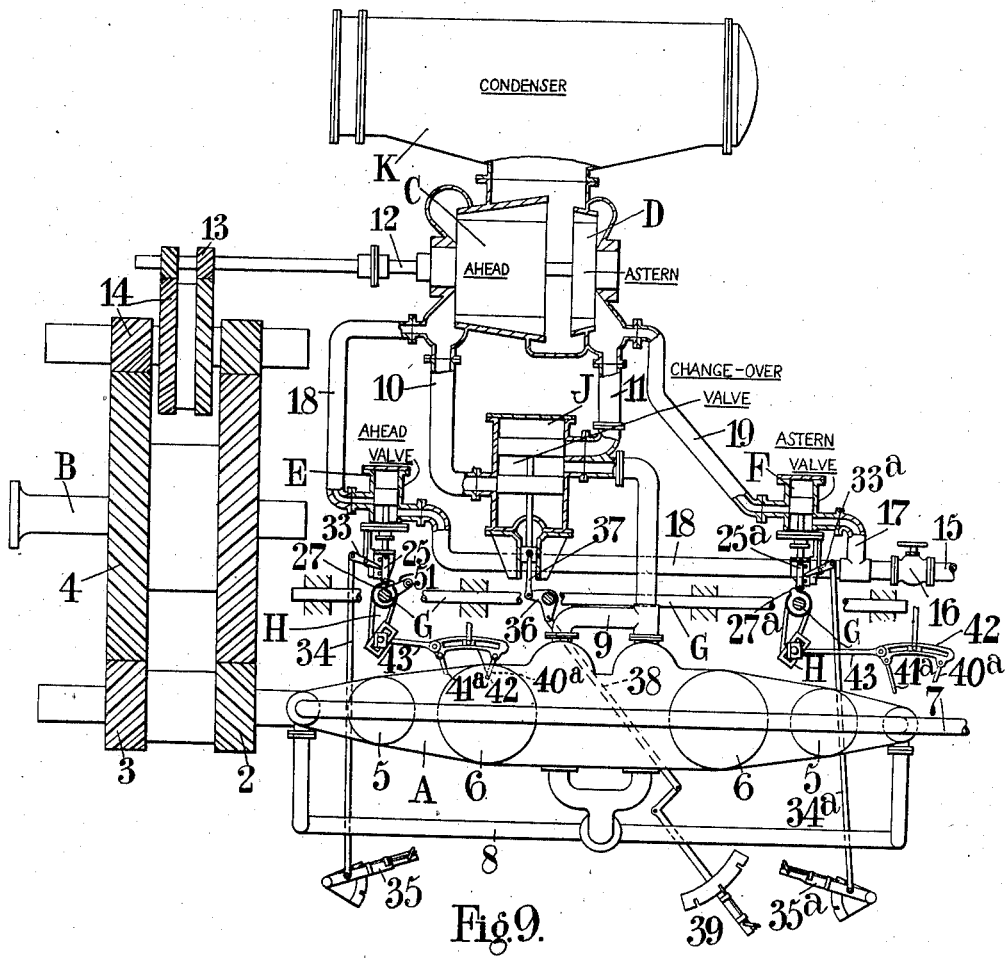

Figures 3 and 4 being corresponding end elevations of the ahead and astern auxiliary valves respectively of Figure 3 looking in the direction of the arrows, with the reversing gear in mid position;

Figures 5, 6 and 7 show end views also on an enlarged scale of different positions of the ahead valve and cam;

Figure 8 shows an end elevation of the reciprocator with one of the auxiliary valves; while Figure 9 shows a diagrammatic lay-out of the whole installation.

When desirable, the same reference symbols are used in the different figures to denote corresponding parts.

In carrying the invention into effect according to one form as applied to a steam propulsion unit for marine purposes, a reciprocator A of the high-speed type has mounted on its crankshaft 2 a pinion 3 gearing with a corresponding wheel 4 on the propeller shaft B.

In the example shown, the reciprocator A is of the double-compound type having two high-pressure cylinders 5, 5 and two low-pressure cylinders 6, 6 in line.

Steam from the boiler passes to the two high-pressure cylinders 5, 5 through the steam pipe 7 from the high-pressure cylinders 5, 5 to the two low-pressure cylinders 6, 6 through the piping 8 and exhausts from the low-pressure cylinders 6, 6 by way of the eduction pipes 9 under the control of a change-over valve J to either an ahead turbine C through pipe 10 or to an astern turbine D through pipe 11, the two turbines being mounted on the same shaft 12 which also carries a pinion 13 geared to the main wheel 4 on the propeller shaft through double-reduction gearing 14, 14 as shown.

All the gearing is preferably of the double-helical type.

An independent supply of live steam from the boiler is led through a pipe 15 fitted with control valve 16 to a junction piece 17 from which steam pipes 18 and 19 pass respectively to the ahead turbine C and the astern turbine D, these pipes being respectively controlled by suitable valves E and F. The two valves are of similar construction and are operated by mechanism from the reciprocator weigh-shaft G forming part of the well-known Stephenson's reversing gear.

A common form of this gear is shown in Figure 8 comprising the ahead eccentric 40, the astern eccentric 41, with their respective eccentric rods 40a, 41a connected to the quadrants 42, which in turn are connected by drag links 43 to the usual slot 44 in the reversing lever H on the weigh-shaft. This gear may be operated by a hand crank 45 turning a worm 46 gearing with a worm wheel 47, a link 48 being pivoted at 49 to this wheel at one end and at the other end at 50 to the end of the lever 51 secured rigidly on the weigh-shaft G.

For convenience the mechanism relating to the ahead valve E only will be described.

The valve proper (see Figures 2 and 3) consists of a piston 20, movement of which uncovers ports 21, the valve as a whole being arranged with its axis vertical and directly above the weigh-shaft G. The lower end of the valve spindle 22 is attached to a cross-head 23 moving on suitable guides 24 and to this crosshead are pivoted a pair of links 25, 25 carrying between them at their lower ends a roller 26 adapted to contact with a cam 27 on the weigh-shaft G.

According to one construction, (see Figure 2) the weigh-shaft G is provided with flanges 29 on the periphery of which the cam 27 is formed.

Suitable stops 30, 31 are provided on the crosshead 23 so that the links 25, 25 when in contact with these stops are in a vertical position but are free to swing in the direction away from the stops to an extent sufficient to carry them clear of the cam.

With the reversing lever H on the weigh-shaft G in its mid position (see Figure 3), the links are disposed vertically and movement of the weigh-shaft in the direction of the arrow (see Figure 3), to the ahead position causes the ahead cam 27 to contact with the roller 26 in a direction to force the links 25 against the stops 30, 31 so that as the swell of the cam passes under the roller (see Figure 5), the links raise the valve spindle 22 and so open the valve E and admit a blast of steam to the ahead turbine C to assist in starting it, the valve being returned to its closed position (see Figure 6) by a spring 32 when the swell of the cam has passed.

A similar valve and operating mechanism is provided for the astern turbine but arranged to the other hand so that the astern cam operates the valve when the weigh-shaft is being moved to its astern position, see Figure 4, in which parts already described with reference to the ahead valve E are denoted by the same numerical symbols with the suffix a.

If the reciprocator is moved from the full-ahead to the full-astern position, during some part of the first half of the movement of the reversing lever and weigh-shaft, the ahead cam 27 (see Figure 7) swings the links 25, 25 operating the ahead valve E to one side without movement of the ahead valve, but during some part of the latter half of the movement the astern cam 27a comes into action and admits a blast of steam to the astern turbine D thereby acting as a brake to slow down the ahead movement of the turbine shaft.

A similar action takes place when changing from full-astern to full-ahead.

A braking effect can also be obtained when, for example, the reciprocator is stopped from the ahead position and in this case the reversing lever should be moved slightly beyond its mid position so as momentarily to operate the valve F admitting steam to the astern turbine D after which the gear is returned to the mid position.

A similar manœuvre is possible when changing over from the astern to the stop position.

In cases of emergency when it is not advisable to operate as described above, means are provided for throwing the automatic mechanism out of action, and according to one form of this part of the invention, a double lever 33 (see Figure 3), is pivoted on a suitable part of the guide 24, one end of the lever passing between the stops 30, 31 on the crosshead 23 and the other end being connected by a link 34 to a hand-operating gear 35.

The free end of the lever 33 is of such a length that when butting against the upper stop 30 it swings the link 25 into such a position that the cams 27, 27a pass clear of the roller 26. By downward movement of the hand lever 35 the free end of the lever 33 is raised and on contacting with the stop 30 raises the valve E which is returned by the spring 32 on downward movement of the lever 35.

The invention is not confined in scope to the use of Stephenson's reversing gear since any other gear may be used having a shaft equivalent to the weigh-shaft described above.

I claim:

In combination a reciprocating engine and ahead and astern turbine engines receiving exhaust therefrom; ducts admitting auxiliary supplies of live working fluid respectively to said ahead and astern turbine engines; valve means controlling fluid flow through said ducts; means for reversing said reciprocating engine, said means including valve actuating means and a weigh-shaft; cams turning with said weigh-shaft; means operated by said cams for actuating said controlling-valve means automatically in response to certain movements of said weigh-shaft, said controlling-valve actuating means including a swinging link engaged by one of said cams and an abutment operatively disposed in relation thereto, said link being rendered operative when forced against said abutment by said cam and rendered inoperative when swung away from said abutment by said cam.

WILLIAM ALBERT WHITE.